April 12, 1955  A. YANTZER  2,705,891
ELECTRIC TIRE PRESSURE GAUGE
Filed Dec. 23, 1953  2 Sheets-Sheet 1
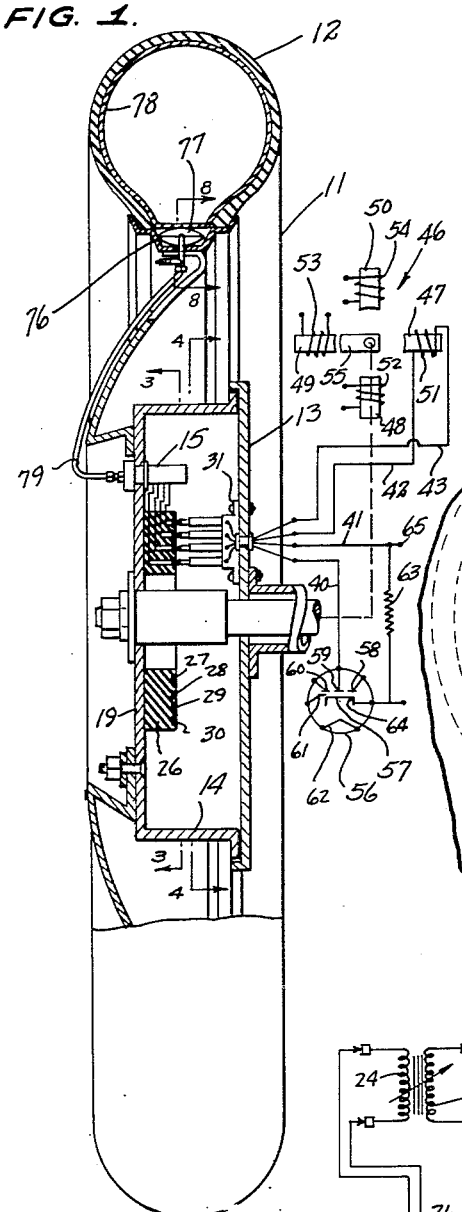
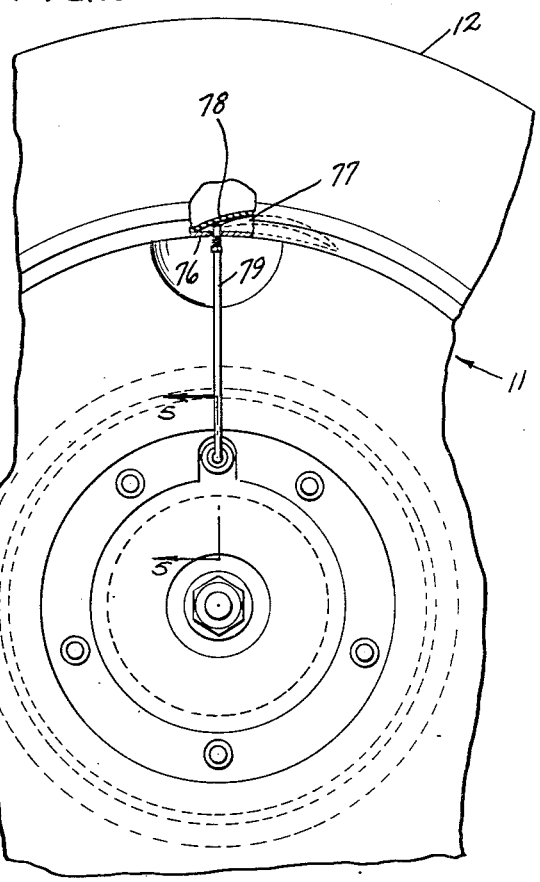
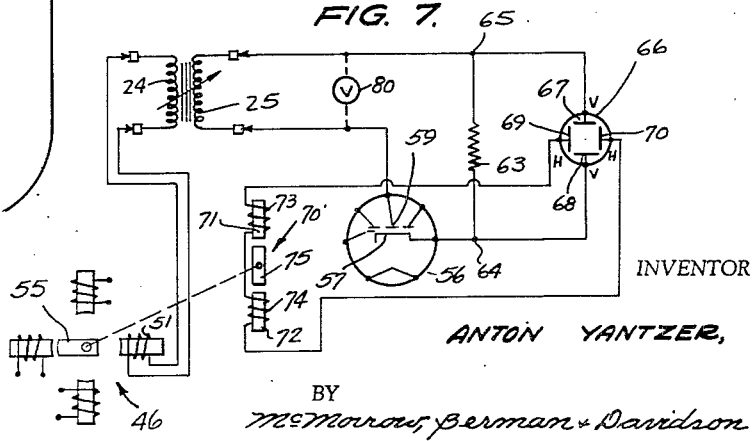
INVENTOR
ANTON YANTZER,
BY
McMorrow, Berman & Davidson
ATTORNEYS

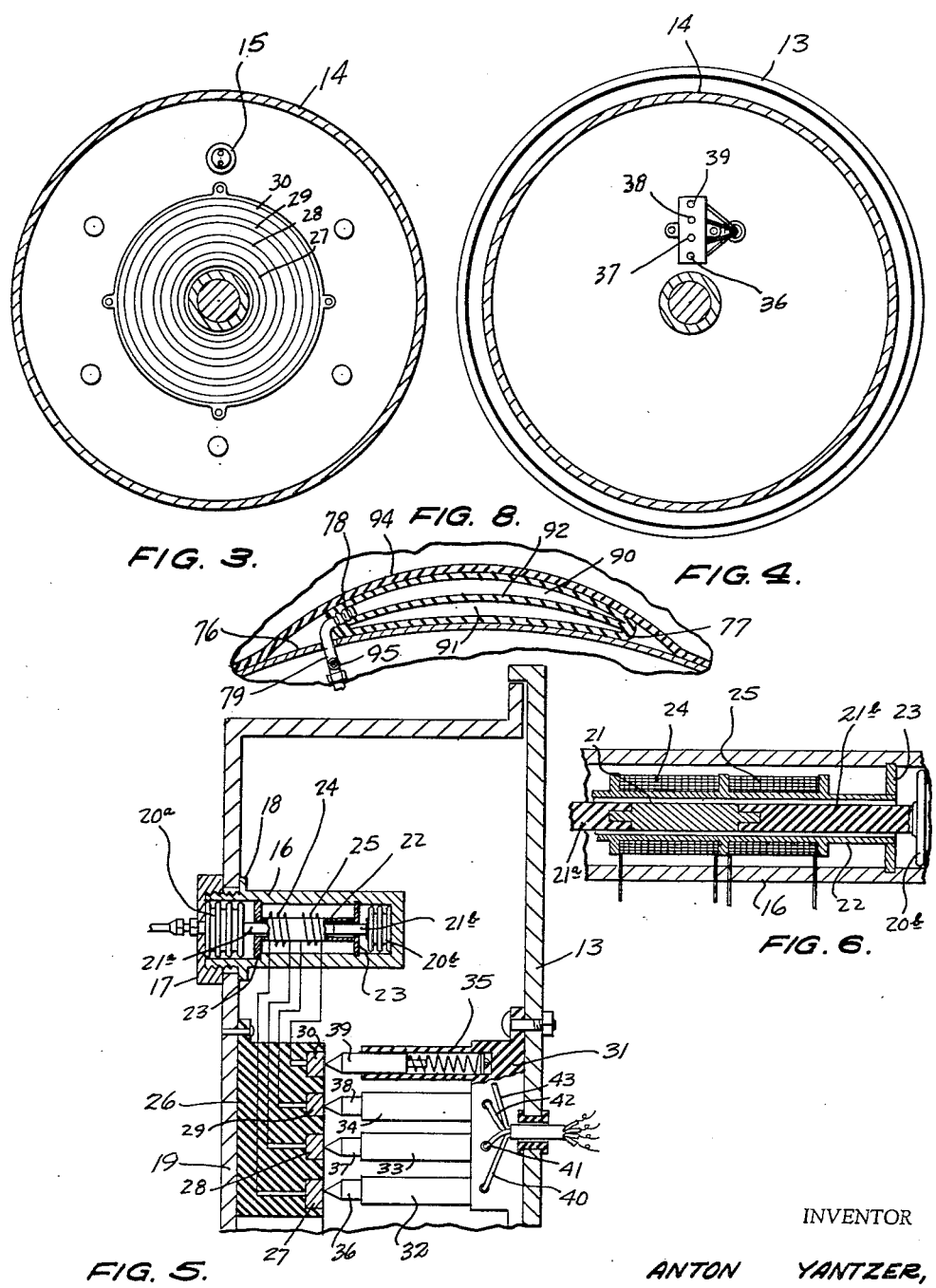

United States Patent Office 2,705,891
Patented Apr. 12, 1955

2,705,891

ELECTRIC TIRE PRESSURE GAUGE

Anton Yantzer, Rapid City, S. Dak.

Application December 23, 1953, Serial No. 399,909

3 Claims. (Cl. 73—390)

This invention relates to motor vehicle tire pressure gauge devices, and more particularly an improved electronic tire pressure indicating system.

A main object of the invention is to provide a novel and improved tire pressure indicating system for motor vehicles, the system involving relatively simple parts, being easy to install, and providing a reliable and accurate indication of the tire pressures in the respective tires of the motor vehicle.

A further object of the invention is to provide an improved tire pressure indicator which provides a series of successive sequential traces on the screen of a cathode ray tube indicating the tire pressure in the various tires of the vehicle and thereby providing an instantaneous indication when the pressure in any of the tires decreases below a safe value, the improved apparatus involving inexpensive components, being durable in construction, and being entirely automatic in operation.

Further objects and advantages of the invention will become apparent from the following description and claims, and from the accompanying drawings, wherein:

Figure 1 is an end elevational view, partly in vertical cross section, of a motor vehicle wheel provided with tire pressure indicating means according to the present invention, said means being shown connected schematically to the associated additional elements forming part of the improved tire pressure indicating system.

Figure 2 is a fragmentary side elevational view, partly in cross section, of the vehicle wheel of Figure 1.

Figure 3 is a cross sectional detail view taken on the line 3—3 of Figure 1.

Figure 4 is a cross sectional detail view taken on the line 4—4 of Figure 1.

Figure 5 is an enlarged cross sectional detail view taken on the line 5—5 of Figure 2.

Figure 6 is an enlarged cross sectional detail view of a pressure-responsive transducer element employed in the system of the present invention, said element being mounted on a vehicle wheel to provide a response to fluctuations in pressure in the tire associated with said wheel.

Figure 7 is a schematic wiring diagram illustrating the electrical connections of the improved electronic tire pressure indicating system of the present invention, the schematic diagram illustrating the connections employed in connection with one of the wheels of a motor vehicle.

Figure 8 is an enlarged cross sectional detail view taken on line 8—8 of Figure 1.

Referring to the drawings, 11 designates one of the wheels of a motor vehicle, said wheel having the pneumatic tire 12 thereon. Designated at 13 is the circular plate element which is rigidly secured to the vehicle frame, and designated at 14 is the brake drum which is secured to the wheel 11 and therefore revolves therewith.

Designated at 15 is a pressure-responsive transducer element which may comprise a transformer provided with a movable core element whose position relative to the windings of the transformer varies in accordance with variations in pressure in the tire 12 of the wheel. Thus, as shown in Figures 1 and 5, a cylindrical housing 16 may be secured to the circular main body portion of the brake drum 14, as being clamped thereto by an annular cap member 17 threadedly engaged on the end of the cylinder 16, the cylinder being provided with an annular flange 18, whereby said cylinder is clampingly secured to the circular main body 19 of brake drum 14 by tightening the cap 17 on the threaded end of the cylinder, as is clearly shown in Figure 5. Disposed in the outer end of cylinder 16 is the axially expansible bellows 20a having the axially extending core rod 21 secured to its inner wall, said core rod being slidably received in a tubular form 22 secured at each end to a centrally apertured disc 23 rigidly secured in housing 16 and supporting the form 22 in an axially extending position in said housing. The intermediate portion of rod 21 is of magnetic material, whereas, the opposite end portions 21a and 21b of said rod are of non-magnetic material. End portion 21b engages the end wall of another axially expansible bellows 20b disposed in the inner end of cylinder 16, the bellows 20b being hermetically sealed, and serving as a loading device for the bellows 20a, such that as bellows 20a expands, it compresses bellows 20b until bellows 20b exerts a counter-pressure equal to the pressure exerted by bellows 20a. The tubular form 22 is of non-magnetic material, and has wound thereon a primary winding 24 and a secondary winding 25, the windings 24 and 25 being in inductively coupled relationship, the coupling therebetween being regulated in accordance with the movement of the magnetic intermediate portion of core rod 21 axially through the form 22.

Concentrically mounted on the circular wall 19 of brake drum 14 is the annular insulating block 26 having the respective concentric conductor rings 27, 28, 29 and 30 secured to the face thereof. The terminals of the transformer primary winding 24 are connected to the rings 29 and 30 and the terminals of the transformer secondary winding 25 are connected to the rings 27 and 28.

Secured to the circular plate 13 is the insulating block 31 formed with the radially aligned brush housings 32, 33, 34 and 35 in which are disposed the respective contact brushes 36, 37, 38 and 39 which slidably engage and make electrical contact with the respective circular conductor rings 27 to 30. The contact brushes 36 to 39 are electrically connected to respective conductors 40 to 43, as shown in Figure 5.

Designated schematically at 46 is a generator comprising the respective radially extending poles 47 to 50, said poles having the respective windings 51 to 54 wound thereon. Each of the windings 51 to 54 is connected to the primary winding of a respective transformer associated with a respective wheel of the vehicle. Thus, the winding 51 has its terminals connected to the conductors 42 and 43, whereby the terminals of said winding 51 are electrically connected through the brushes 38 and 39 and the conductive rings 29 and 30 to the primary winding 24 associated with the wheel 11.

The generator 46 is provided with the rotary member 55, comprising a permanent magnet, whereby rotation of said member 55 induces respective currents in the windings 51 to 54, said currents being displaced in phase in accordance with the angular spacing of the poles 47 to 50, namely, being displaced 90° in phase, since said poles are arranged at angles of 90° relative to each other. The member 55 is coupled in any suitable manner to a driving motor, or other suitable driving means.

Designated at 56 is a vacuum tube of the multiple diode type, said tube comprising a cathode 57 and four independent anodes 58, 59, 60 and 61, the cathode 57 being heated in the usual manner by the tube filament 62 and being arranged to emit electrons which will be attracted to the respective anodes 58 to 61, producing rectification of signals in the circuits associated with the respective anodes and the cathode 57 in the usual manner.

The secondary winding 25 of the transducer element 15 is connected to the anode of tube 56 and to the output terminal 65. Thus, the secondary 25 is connected through the conductor rings 27 and 28, the brushes 36 and 37, and the conductors 40 and 41 to anode 59 and to cathode 57 through a load resistor 63, as shown in Figure 1. The rectified current wave delivered by secondary winding 25 is thus made available across said load resistor at the output terminals 64 and 65.

Alternatively, a respective crystal diode may be employed for each transducer circuit, each diode having its cathode and connected to output terminal 64 in Figure 1 and its anode end connected to a respective transducer secondary winding.

Mounted in the motor vehicle in a suitable, visible position is a cathode ray tube 66, said tube having the vertical deflection plates 67 and 68 and the horizontal deflection plates 69 and 70. Output terminal 65 is connected to the vertical plate 67 and output terminal 64 is connected to the vertical plate 68, as shown in Figure 7. The secondary winding 25 of the transducer element 15 is connected between the anode 59 of the tube 56 and the output terminal 65, as above pointed out, and hence, the rectified current wave appears as a signal on the cathode ray tubes 66. It is to be noted that only winding 51 of the generator 46 is shown in circuit with the transducer element 15 applied to the single wheel 11, the other windings 52, 53 and 54 of the generator 46 being connected to respective transducer elements 15 associated with the other wheels not shown, and in out of phase relation with respect to the winding 51. The output of the windings 52, 53 and 54 will then appear sequentially in 90° displaced phase relationship across the output terminals 64 and 65 and are thus applied in the same 90° displaced phase relationship to the vertical deflection plates 67 and 68 of the cathode ray tube 66. Suitable amplifier stages may be employed for vertical signal amplification before the signal is fed to the vertical plates of the cathode ray tube.

Designated at 70' is a second generator comprising the opposing stationary poles 71 and 72 having the respective windings 73 and 74 thereon, and the rotary permanent magnet member 75 which is coupled, in any suitable manner to the member 55 of generator 46 so as to be rotated synchronously therewith. The windings 73 and 74 are connected in series, and the respective end terminals of the series circuit thus defined are connected respectively to the horizontal deflection plates 69 and 70 of the cathode ray tube 66. Thus, there are two sweeps of the electron beam on the cathode ray tube face, one from right to left and the other from left to right, for each complete cycle of rotation of member 55 of generator 46. The output wave of the generator 70' may be shaped in any suitable manner, well known in the art, to deliver the proper wave for sweeping the beam of cathode ray tube 66 across the face of the tube to provide a trace properly synchronized with the output waves appearing across the terminals 64 and 65 of the circuit of tube 56. In the circuit arrangement shown in Figure 7, since the generator 70' is in synchronism with the generator 46, a stationary pattern will be defined on the face of the cathode ray tube 66, said pattern comprising four distinct elements, each associated with the output of the transducer provided on a respective wheel of the vehicle. The amplitude of each of said distinct pattern elements will vary in accordance with the amplitude of the output wave delivered by the secondary winding of the transducer associated therewith.

Disposed in the well portion 76 of each of the wheels of the vehicle is an inflated bulb 77 engaged by the inflated inner tube 78 of the associated tire. Each bulb 77 comprises an elongated body of resilient deformable material, such as rubber or the like having an upper chamber 90 (Figure 8) and a sealed lower chamber 91, separated from chamber 90 by a flexible diaphragm member 92. Each upper chamber 90 is connected by a conduit 79 to the associated expansible bellows element 20a, whereby variations in air pressure in the tube 78 will be transmitted through the associated bulb chamber 90 to the associated bellows 20a, causing the magnetic intermediate portion of the associated rod 21 to be displaced axially. This varies the coupling between the primary and secondary windings of the associated transducer, whereby the amplitude of the output wave delivered by the secondary winding is varied in the same manner and reflects the variation in tire pressure. The variation in tire pressure of any of the vehicle wheels thus appears as a change in amplitude in the associated stationary trace element appearing on the cathode ray tube face, providing an instant indication of the change in tire pressure and enabling the operator of the vehicle to make the necessary repair to the tire or tube or to inflate the tire to return it to its normal pressure.

Chamber 91 contains an amount of air or gas which is sealed in said chamber. When the wheel revolves it generates centrifugal force which tends to move the upper wall 94 of chamber 90 outwardly and away from rim 76, thereby reducing the pressure in chamber 90, which would tend to give a false indication. The diaphragm 92, which has the same weight as wall 94, is pulled in the same direction as wall 94, and serves to maintain the same pressure in chamber 90 under the effects of centrifugal force.

When installing the bulb 77 in a tire, it is first installed uninflated. The tire and tube are mounted and the tube is inflated to its normal pressure. The chamber 90 is then inflated through its valve, shown at 95, until the reading on the indicating device is the same as the known pressure in the tire, after which the device will operate automatically.

The system may be used without bulb 77, whereby conduit 79 is connected by suitable means to the inflating valve on the inner tube, and the valve 95 is thereafter used to inflate the tube.

As shown in Figure 7, in addition to the cathode ray tube 66, respective meters 80, or other suitable indicating means, may be connected across the output conductors associated with the secondary windings of the respective pressure-responsive transducers, whereby the tire pressures in the respective wheels will be indicated by observing the readings of the respective meters 80.

While a specific embodiment of an improved electronic vehicle tire pressure indicating system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a vehicle wheel having a pneumatic tire thereon, a cathode ray oscilloscope having vertical deflection means and horizontal deflection means, a transformer mounted on said wheel, means for varying the coupling between the windings of the transformer in accordance with changes in pressure in said tire, a generator, means connecting the output of said generator to said horizontal deflection means, additional generator means, means connecting the output of said additional generator means to one of the windings of said transformer, said generator and additional generator means being operable in synchronism, and means connecting another winding of said transformer to the vertical deflection means.

2. In a motor vehicle, a wheel having a pneumatic tire thereon, pressure-responsive indicator means, and a flexible bulb mounted on the rim of the wheel between said rim and the tire, said bulb having an outer compartment and an inner compartment, the inner compartment being sealed and the outer compartment being connected to said indicator means, and a flexible wall in the bulb separating said compartments, said flexible wall being distortable outwardly under the effects of centrifugal force to compensate for distortion of the outer wall of said outer compartment.

3. In a motor vehicle, a wheel having a pneumatic tire thereon containing a tube, pressure-responsive indicator means and a flexible bulb mounted on the rim of the wheel between said rim and the tube, said bulb having a flexible intermediate wall defining a sealed inner compartment and an outer compartment, and means connecting said outer compartment to said pressure-responsive indicator means, said intermediate wall being outwardly flexible to compensate for outward flexure of the bulb under the effects of centrifugal force.

References Cited in the file of this patent

UNITED STATES PATENTS

| | | |
|---|---|---|
| 2,096,826 | Schrader | Oct. 26, 1937 |
| 2,145,363 | Miller | Jan. 31, 1939 |
| 2,439,047 | Grinstead et al. | Apr. 6, 1948 |
| 2,439,561 | Cressey | Apr. 13, 1948 |
| 2,510,073 | Clark | June 6, 1950 |